United States Patent
Michetti (10) Patent No.: US 12,420,530 B2
(45) Date of Patent: Sep. 23, 2025

(54) LAMINATED GLAZING

(71) Applicant: Pilkington Group Limited, Lancashire (GB)

(72) Inventor: Massimo Michetti, San Salvo (IT)

(73) Assignee: Pilkington Group Limited, Nr. Ormskirk (GB)

( * ) Notice: Subject to any disclaimer, the term of this patent is extended or adjusted under 35 U.S.C. 154(b) by 0 days.

(21) Appl. No.: 18/505,434

(22) Filed: Nov. 9, 2023

(65) Prior Publication Data

US 2024/0066839 A1 Feb. 29, 2024

Related U.S. Application Data

(63) Continuation of application No. 17/041,479, filed as application No. PCT/GB2019/050791 on Mar. 21, 2019, now abandoned.

(30) Foreign Application Priority Data

Mar. 27, 2018 (EP) ..................... 18425022

(51) Int. Cl.
*B32B 17/10* (2006.01)
*B32B 7/12* (2006.01)
(Continued)

(52) U.S. Cl.
CPC .......... *B32B 17/10137* (2013.01); *B32B 7/12* (2013.01); *B32B 17/10036* (2013.01);
(Continued)

(58) Field of Classification Search
CPC ............... B32B 17/10137; B32B 7/12; B32B 17/10036; B32B 17/10293; C03C 3/085; C03C 3/087; C03C 4/18; C03C 2204/00
See application file for complete search history.

(56) References Cited

U.S. PATENT DOCUMENTS

| 4,985,099 A | 1/1991 | Wasterlain et al. |
| 5,013,134 A | 5/1991 | Smith |

(Continued)

FOREIGN PATENT DOCUMENTS

| WO | 0207967 A1 | 1/2002 |
| WO | 2006043026 A1 | 4/2006 |

(Continued)

OTHER PUBLICATIONS

International Search Report and Written Opinion issued in corresponding International Patent Application No. PCT/GB2019/050791, 11 pages (Jul. 2, 2019).

(Continued)

*Primary Examiner* — Alicia J Weydemeyer
*Assistant Examiner* — Laura B Figg
(74) *Attorney, Agent, or Firm* — BUCHANAN INGERSOLL & ROONEY PC (57) ABSTRACT

A laminated glazing comprising first and second sheets of glass joined together by an interlayer structure comprising at least a first layer of adhesive interlayer material is disclosed. The surface compressive stress in a central region of a first major surface of the first sheet of glass is dependent upon the thickness of the first sheet of glass. For a thickness t of the first sheet of glass between 1.4 mm and 2.6 mm the minimum surface compressive stress $CS_{min}$ (in MPa) in the central region of the first major surface of the first sheet of glass is given by $CS_{min}$ (MPa)=$21.0 \times t^3 - 118.6 \times t^2 + 236.9 \times t - a_1$, wherein $a_1$ is between 135 MPa and 140 MPa. The second sheet of glass may be a sheet of chemically strengthened glass having a thickness between 0.3 mm and 1.0 mm. The laminated glazing may be fixed or movable in an aperture in a vehicle.

20 Claims, 3 Drawing Sheets

(51) Int. Cl.
    *C03C 3/085* (2006.01)
    *C03C 3/087* (2006.01)
    *C03C 4/18* (2006.01)

(52) U.S. Cl.
    CPC ........ *B32B 17/10293* (2013.01); *C03C 3/085* (2013.01); *C03C 3/087* (2013.01); *C03C 4/18* (2013.01); *C03C 2204/00* (2013.01)

(56) References Cited

U.S. PATENT DOCUMENTS

| | | |
|---|---|---|
| 5,397,647 A | 3/1995 | Kramling et al. |
| 6,180,237 B1 | 1/2001 | Kato et al. |
| 2002/0023463 A1 | 2/2002 | Siebers et al. |
| 2002/0106519 A1 | 8/2002 | Takahara |
| 2004/0098946 A1 | 5/2004 | Meerman |
| 2005/0143247 A1* | 6/2005 | Siebers .................. C03C 3/085 501/7 |
| 2009/0298669 A1* | 12/2009 | Akiba .................... C03C 3/087 501/69 |
| 2014/0349058 A1* | 11/2014 | Inoue ................ B32B 17/10036 83/13 |
| 2015/0132538 A1 | 5/2015 | Cleary et al. |
| 2015/0224855 A1 | 8/2015 | Legrand |
| 2016/0214885 A1 | 7/2016 | Senshu |
| 2016/0250982 A1* | 9/2016 | Fisher .................... B32B 17/06 428/215 |
| 2021/0114354 A1 | 4/2021 | Winstanley et al. |

FOREIGN PATENT DOCUMENTS

| | | |
|---|---|---|
| WO | 2015092385 A1 | 6/2015 |
| WO | 2017183381 A1 | 10/2017 |

OTHER PUBLICATIONS

Search Report issued in corresponding British Patent Application No. GB1809733.7.3, 4 pages (Nov. 15, 2018).

Notification of the First Office Action issued in Chinese Patent Application No. 201980029071.5, dated Aug. 1, 2022, with English Translation. (15 pages).

* cited by examiner

LAMINATED GLAZING

The present application is a continuation of U.S. patent application Ser. No. 17/041,479, filed Sep. 25, 2020, which is the U.S. National Stage of PCT Patent Application No. PCT/GB2019/050791, filed Mar. 21, 2019, and claims priority to European Patent Application No. 18425022.3, filed Mar. 27, 2018. The entire contents of U.S. patent application Ser. No. 17/041,479, PCT Patent Application No. PCT/GB2019/050791 and European Patent Application No. 18425022.3 are incorporated herein by reference.

The present invention relates to a laminated glazing, in particular to a light weight laminated glazing for use in a vehicle.

It is well known that laminated glazings are used as windows in automotive vehicles. Usually the window is the vehicle windscreen, but may be a vehicle side window, rear window or sunroof. In the art a vehicle side window may be referred to as a vehicle side light. Typically, the vehicle has at least one, usually two, movable side windows, one on either side of the vehicle i.e. the passenger side and the driver side. In addition to movable side windows, there may be one or more fixed side windows, for example front or rear quarter lights.

In the driver's door there is usually a side window that is movable in a vertical direction by actuation of a suitable winder mechanism. The winder mechanism may be manually or electrically operated and has at least one element in mechanical communication with the side window to move the side window within the vehicle aperture defining the driver's side window.

It is known that a vehicle side window may comprise a sheet of thermally toughened glass. When such a thermally toughened sheet of glass is broken, the integrity of the vehicle side window is lost as the sheet of glass is broken into many small fragments.

In order to reduce the weight of a vehicle side window it is known to use thin sheet of glass that are laminated together by means of an adhesive interlayer such as polyvinyl butyral (PVB). It is known to vary the compressive stress in at least one of the sheets of glass of the laminate to provide desirable mechanical characteristics.

It is also known that the laminated side window may have a construction such that when the side window is fully closed, the sheet of glass facing the interior of the vehicle does not extend fully downwards to the winder mechanism. Instead the winder mechanism is only connected to a connector region that is part of the outer sheet of glass of the laminated glazing. Actuation of the winder mechanism still moves the inner sheet of glass at the same time as the outer sheet of glass because the outer sheet of glass is joined to the inner sheet of glass by the adhesive interlayer material (such as PVB). However, the winder mechanism is not in direct physical contact with the inner sheet of glass.

It is also known to use a sheet of chemically strengthened glass as an inner facing sheet in a vehicle side window, for example as described in U.S. Pat. No. 4,985,099 and U.S.2015/0224855A1. The sheet of chemically strengthened glass may be coextensive with the outer pane of glass or may only cover the aperture portion of the vehicle when in a closed position as described above.

Laminated glazings comprising an outer ply (or sheet) of soda-lime-silicate glass and an inner ply of chemically strengthened glass are described in WO2015/092385A1.

WO02/07967A1 describes a laminated glazing panel having at least one sheet of glass having a thickness of between 0.8 mm and 3.5 mm. The glass sheet has: a) an edge compression stress of between 20 MPa and 80 MPa; and b) a surface compressive stress at a central portion of the glass of between 2 MPa and 39 MPa. The glazing panel may be used as a laminated automotive glazing.

WO2006/043026A1 describes laminated glazings having a solar control function.

The present inventor has found that the level of the surface compressive stress in a laminated vehicle side window may be varied depending upon the glass thickness of the outer sheet of glass.

Accordingly the present invention provides a laminated glazing comprising a first sheet of glass joined to a second sheet of glass by an interlayer structure comprising at least one (a first) layer of adhesive interlayer material, wherein the first and second sheets of glass each have respectively a first major surface and a second opposing major surface and the laminated glazing is arranged such that at least a portion of the second major surface of the first sheet of glass faces the first major surface of the second sheet of glass; wherein the first sheet of glass has a surface compressive stress in at least a central region of the first major surface of the first sheet of glass of at least $CS_{min}$, wherein for a thickness t of the first sheet of glass between 1.4 mm and 2.6 mm, $CS_{min}$ in MPa is given by $$CS_{min}(MPa) = 21.0 \times t^3 \times 118.6 \times t^2 + 236.9 \times t - a_1$$

wherein $a_1$ is between 135 MPa and 140 MPa, preferably wherein $a_1 = 138.5$ MPa.

The present inventor has found by utilising the above equation the mechanical characteristics required for the laminated glazing, in particular a laminated side window for a vehicle, may be rapidly obtained for a given thickness of the first sheet of glass in the range of 1.4 mm to 2.6 mm.

Preferably for a thickness t of the first sheet of glass between 1.4 mm and 2.6 mm, the surface compressive stress (in MPa) in the central region of the first major surface of the first sheet of glass is less than $CS_{max}$, wherein $CS_{max}$, is given by $$CS_{max}(MPa) = 28.3 \times t^3 - 139.8 \times t^2 + 244.6 \times t - b_1$$

wherein $b_1$ is between 120 MPa and 126 MPa preferably wherein $b_1 = 123.1$ MPa.

Preferably the thickness of the second sheet of glass is greater than 0.3 mm and/or less than 1.0 mm.

Preferably the thickness of the second sheet of glass is less than 1.0 mm or less than 0.8 mm.

Preferably the thickness of the second sheet of glass is greater than 0.3 mm.

Preferably the thickness of the second sheet of glass is between 0.3 mm and 1.0 mm.

Preferably the thickness of the second sheet of glass is between 0.3 mm and 0.8 mm.

Preferably the second sheet of glass has been chemically strengthened.

Preferably the second sheet of glass is an alkali aluminosilicate glass composition.

Preferably the second sheet of glass includes at least about 6 wt % aluminium oxide.

Preferably the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Preferably the second sheet of glass is chemically strengthened to have a surface compressive stress greater than 400 MPa, preferably between 400 MPa and 900 MPa, more preferably between 400 MPa and 700 MPa, even more preferably between 450 MPa and 675 MPa.

Preferably the second sheet of glass is chemically strengthened to have a surface compressive stress of around 900 MPa or less.

Preferably the second sheet of glass is chemically strengthened to have a depth of layer (DOL) between 10 µm and 60 µm, more preferably between 25 µm and 45 µm, even more preferably between 30 µm and 40 µm.

Preferably the first sheet of glass is a sheet of float glass.

Preferably the First Sheet of Glass is a Sheet of Soda-Lime-Silicate Glass.

Preferably the first sheet of glass has a composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Preferably the first layer of adhesive interlayer material is coextensive with the first or second sheet of glass.

Preferably the first sheet of glass is coextensive with the second sheet of glass.

Preferably the first layer of adhesive interlayer material is coextensive with the first sheet of glass and the second sheet of glass.

Preferably the first layer of adhesive interlayer material comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first layer of adhesive interlayer material has a thickness between 0.3 mm and 2.3 mm, preferably between 0.3 mm and 1.6 mm, more preferably between 0.3 mm and 0.9 mm.

Preferably the first and/or second sheet of glass comprises a respective first connection portion for connecting the laminated glazing to a mechanism for moving the laminated glazing, preferably in a vertical direction.

The first and second sheets of glass each have a periphery. Preferably the periphery of the second sheet of glass is contiguous with the periphery of the first sheet of glass or the periphery of the second sheet of glass is enclosed within the periphery of the first sheet of glass.

When the periphery of the second sheet of glass is enclosed within the periphery of the first sheet of glass, a portion of the periphery of the first sheet of glass may be aligned with a portion of the periphery of the second sheet of glass.

From a second aspect the present invention also provides a laminated glazing comprising a first sheet of glass joined to a second sheet of glass by an interlayer structure comprising at least one (a first) layer of adhesive interlayer material, wherein the first and second sheets of glass each have respectively a first major surface and a second opposing major surface and the laminated glazing is arranged such that at least a portion of the second major surface of the first sheet of glass faces the first major surface of the second sheet of glass; the first sheet of glass having a thickness greater than 2.6 mm and less than 8 mm, preferably less than 6 mm, and wherein a surface compressive stress in a central region of the first major surface of the first sheet of glass is between 50 MPa and 150 MPa; the second sheet of glass being a sheet of chemically strengthened glass having a thickness between 0.3 mm and 1.0 mm, a surface compressive stress greater than 400 MPa and a depth of layer (DOL) between 10 µm and 60 µm.

Preferably the second sheet of glass has a thickness between 0.4 mm and 0.8 mm.

Preferably the second sheet of glass is an alkali aluminosilicate glass composition.

Preferably the second sheet of glass includes at least about 6 wt % aluminium oxide.

Preferably the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Preferably the second sheet of glass is chemically strengthened to have surface compressive stress between 400 MPa and 900 MPa, more preferably between 400 MPa and 700 MPa, even more preferably between 450 MPa and 675 MPa.

Preferably the second sheet of glass is chemically strengthened to have a depth of layer between 25 µm and 45 µm, even more preferably between 30 µm and 40 µm.

Preferably the first sheet of glass is a sheet of float glass.

Preferably the first sheet of glass is a sheet of soda-lime-silicate glass.

Preferably the first sheet of glass has a glass composition comprising (by weight), $SiO_2$ 69-74%; $Al_2O3$ 0-3%; $Na_2O$ 10-16%; $K_2O$ 0-5%; MgO 0-6%; CaO 5-14%; SO3 0-2% and $Fe_2O_3$ 0.005-2%.

Preferably the first layer of adhesive interlayer material is coextensive with the first or second sheet of glass.

Preferably the first sheet of glass is coextensive with the second sheet of glass.

Preferably the first layer of adhesive interlayer material is coextensive with the first sheet of glass and the second sheet of glass.

Preferably the first layer of sheet of adhesive interlayer material comprises polyvinyl butyral (PVB), acoustic modified PVB, a copolymer of ethylene such as ethylene vinyl acetate (EVA), polyurethane, polycarbonate, poly vinyl chloride (PVC) or a copolymer of ethylene and methacrylic acid.

Preferably the first layer of adhesive interlayer material has a thickness between 0.3 mm and 2.3 mm, preferably between 0.3 mm and 1.6 mm, more preferably between 0.3 mm and 0.9 mm.

Preferably the first and/or second sheet of glass comprises a respective first connection portion for connecting the laminated glazing to a mechanism for moving the laminated glazing, preferably in a vertical direction.

The first and second sheets of glass each have a periphery. Preferably the periphery of the second sheet of glass is contiguous with the periphery of the first sheet of glass or the periphery of the second sheet of glass is enclosed within the periphery of the first sheet of glass.

When the periphery of the second sheet of glass is enclosed within the periphery of the first sheet of glass, a portion of the periphery of the first sheet of glass may be aligned with a portion of the periphery of the second sheet of glass.

Laminated glazings in accordance with the first and/or second aspect of the present invention have other preferable features.

Preferably the laminated glazing has a solar control function.

In some embodiments the solar control function of the laminated glazing is provided at least in part by a solar control coating on the first and/or second sheet of glass.

Preferably the first major surface of the first sheet of glass has a solar control coating on a least a portion thereof.

Preferably the second major surface of the first sheet of glass has a solar control coating on a least a portion thereof.

Preferably the first major surface of the second sheet of glass has a solar control coating on a least a portion thereof.

Preferably the second major surface of the second sheet of glass has a solar control coating on a least a portion thereof.

Preferably the solar control coating on the first and/or second major surface of the first and/or second sheet of glass comprises an absorbing coating, in particular a coating for absorbing infrared radiation.

Preferably the solar control coating on the first and/or second major surface of the first and/or second sheet of glass comprises a reflective coating, in particular an infrared ray reflective coating.

When the laminated glazing has a solar control function, the solar control function may be provided at least in part by the first and/or second sheet of glass. For example, the first and/or second sheet of glass may be suitably body tinted.

When the laminated glazing has a solar control function, the solar control function may be provided at least in part by the interlayer structure.

Preferably the first layer of adhesive interlayer material comprises functional inclusions for reducing the amount of solar radiation that may otherwise be transmitted through the first layer of adhesive interlayer material.

Preferably the first layer of adhesive interlayer material comprises absorbers for absorbing solar radiation.

Preferably the interlayer structure comprises two or more adhesive layers of interlayer material spaced apart by an intermediate sheet, wherein the intermediate sheet is used to provide at least in part the laminated glazing with the solar control function.

Preferably the intermediate sheet is used as a carrier sheet for an infrared ray reflecting coating.

Preferably the intermediate sheet comprises polyethylene terephthalate (PET), polycarbonate or a sheet of glass.

When the intermediate sheet is used as a carrier sheet for an infrared ray reflecting coating, preferably the infrared ray reflecting coating comprises at least one layer of a metal, more preferably at least one layer of silver.

In other embodiments of the first and/or second aspects of the present invention, the first and/or second sheet of glass includes a functional coating.

Preferably the first major surface of the first sheet of glass has a functional coating on a least a portion thereof.

Preferably the second major surface of the first sheet of glass has a functional coating on a least a portion thereof.

Preferably the first major surface of the second sheet of glass has a functional coating on a least a portion thereof.

Preferably the second major surface of the second sheet of glass has a functional coating on a least a portion thereof.

In some embodiments where the first and/or second major surface of the first and/or second sheet of glass has a functional coating on a least a portion thereof, preferably the functional coating comprises an ultra violet ray shielding function and/or a tinting function, such that the passage of visible light and/or ultra violet radiation through the laminated glazing is modified by the presence of the functional coating.

In some embodiments of the first and/or second aspects of the present invention, the first major surface of the first sheet of glass and/or the second major surface of the second sheet of glass has a functional coating on a least a portion thereof, and the functional coating comprises a self-cleaning type coating.

In some embodiments of the first and/or second aspects of the present invention, the laminated glazing comprises a low emissivity coating on at least a portion of the first and/or second major surface of the first and/or second sheet of glass.

Preferably the low emissivity coating comprises at least one layer of an oxide of a metal such as tin, zinc, indium, tungsten and molybdenum. The at least one layer of an oxide of a metal may comprise a dopant such as fluorine, chlorine, antinomy, tin, aluminium, tantalum, niobium, indium or gallium, so that coatings such as fluorine-doped tin oxide and tin-doped indium oxide may result.

Preferably the low emissivity coating comprises at least one metal layer and preferably at least one dielectric layer. The at least one metal layer preferably comprises silver, gold, copper, nickel or chromium.

From another aspect the present invention provides a vehicle having an aperture for a window, in particular a side window, wherein a laminated glazing according to the first and/or second aspect of the present invention is fixed within the aperture.

From another aspect the present invention provides a vehicle having an aperture for a window, in particular a side window, wherein a laminated glazing according to the first and/or second aspect of the present invention is movable within the aperture.

From another aspect the present invention provides a vehicle having an aperture for a window, in particular a side window, wherein a laminated glazing according to embodiments of the first and/or second aspect of the present invention wherein the first and/or second sheet of glass comprises a respective first connection portion for connecting the laminated glazing to a mechanism for moving the laminated glazing within the aperture. Preferably the laminated glazing is vertically movable in the aperture.

In embodiments wherein the vehicle has a movable glazing in the aperture, suitably the vehicle has an interior and the aperture has a periphery, wherein the laminated glazing is movable to a first position to close the aperture such that from outside the vehicle, the interior of the vehicle is not accessible via the aperture, and when the laminated glazing is in the first position there is a portion of the laminated glazing not facing the aperture and a portion of the second major surface of the first sheet of glass is not facing the first major surface of the second sheet of glass.

The present invention will now be described with reference to the following figures (not to scale) in which.

In the following description of the present invention, surface compressive stress measurements are made using a Strainoptics Laser GASP-CS (http://www.strainoptics.com/files/Laser%20GASP-CS%20Quick-Start%20(English).pdf). Such equipment is available from Strainoptics, Inc., 108 W. Montgomery Avenue, North Wales, PA 19454 USA.

Figure 1:
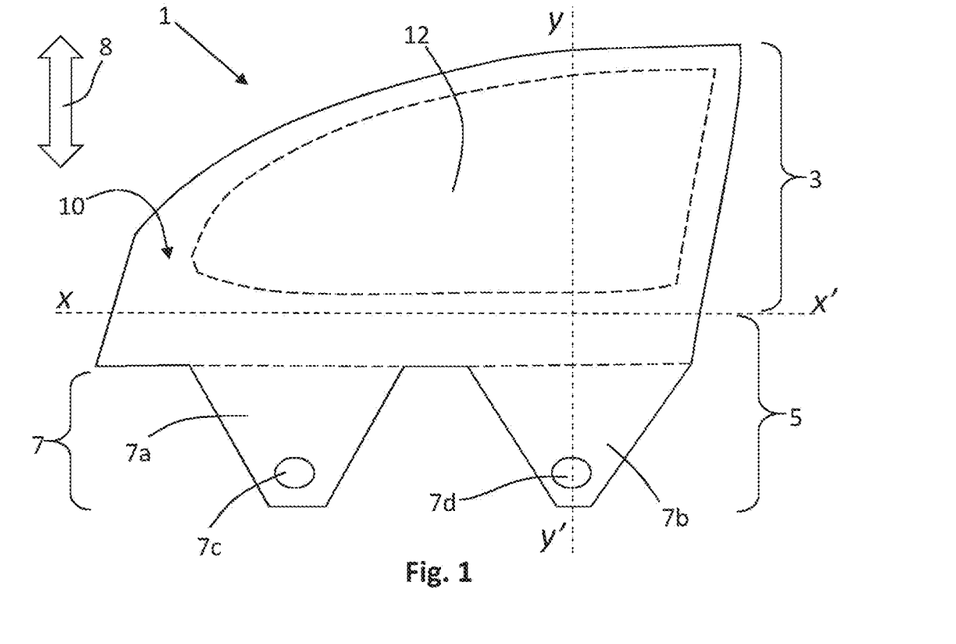
FIG. 1 is a schematic plan view of a vehicle side window in accordance with the first aspect of the present invention.

FIG. 1 shows a plan view of a movable vehicle side window 1. In plan view, the vehicle side window 1 has an upper region 3, a lower region 5 and a connection region 7.

The upper region 3 is defined in relation to a line x-x', and the line x-x' is defined by the styling of the vehicle into which the vehicle side window is installed, as will be discussed in more detail below. In this example the connection region 7 comprises a first trapezoidal portion 7a and a second trapezoidal portion 7b. Each trapezoidal portion 7a, 7b has a respective hole 7c, 7d at the narrow end thereof. The holes 7c, 7d are used to connect a winder mechanism (not shown) to the vehicle side window 1 to move the vehicle side window vertically, i.e. in the direction of arrow 8.

The vehicle side window 1 has a major surface 10 configured for use as an outer surface. The major surface 10 has a central region 12, the central region being inboard of the periphery of the vehicle side window 1.

Although FIG. 1 shows a movable side window, a fixed side window such as a front or rear quarter light may be represented by the same figure but without the presence of the connector region 7. Typically, a front or rear quarter light is fixed in an aperture in the vehicle, although it is known to have a quarter light that may be pivotally mounted into an aperture in the vehicle.

Figure 2:
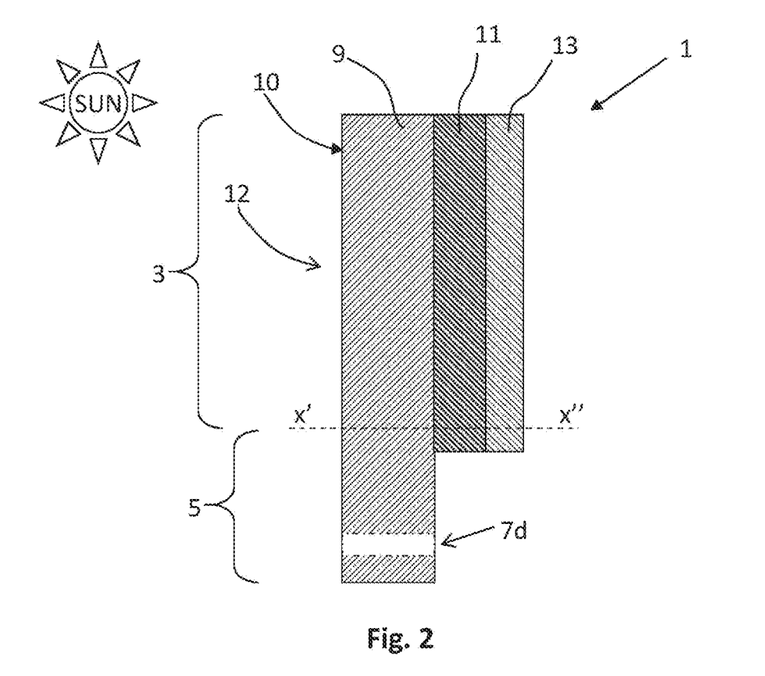
FIG. 2 is a schematic cross-sectional representation of the vehicle side window shown in FIG. 1.

FIG. 2 shows a schematic cross-sectional view of the vehicle side window 1 shown in FIG. 1 taken through the line y-y'. The line x'-x" forms a horizontal plane with the line x-x'.

The vehicle side window 1 comprises a first sheet of glass 9, a layer of polyvinyl butyral (PVB) 11 and a second sheet of glass 13. The layer of PVB joins the first sheet of glass 9 to the second sheet of glass 13.

Using conventional nomenclature, the major surface 10 is known as "surface 1" because it is the first surface of the glazing facing the "outside", i.e. in normal use, the major surface 10 of the vehicle side window 1 is the first surface a ray of sunlight strikes first.

The first sheet of glass 9 is a sheet of soda-lime-silicate glass having a composition such as clear float glass, typically with the addition of iron oxide as a tinting agent to provide the laminated glazing with some form of solar control.

A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; SO3 0-2%; $Fe_2O_3$ 0.005-2%. The glass composition may also contain other additives, for example, refining aids, which would normally be present in an amount of up to 2%. The soda-lime-silicate glass composition may contain other colouring agents such as $Co_3O_4$, NiO and Se to impart to the glass a desired colour when viewed in transmitted light. The transmitted glass colour may be measured in terms of a recognised standard such as BS EN410.

The layer of PVB 11 has a thickness of 0.76 mm, but may have a thickness in the range of 0.3 mm to 1 mm, for example the layer of PVB may have a thickness of 0.38 mm or 0.86 mm.

The second sheet of glass 13 has a thickness of 0.7 mm but may have a thickness in the range of 0.3 mm to 1.0 mm, for example 0.3 mm to 0.8 mm or 0.4 mm to 0.8 mm. The second sheet of glass 13 may have a thickness of 0.5 mm.

The second sheet of glass has been chemically strengthened using a conventional molten salt ion exchange process to exchange sodium ions in the surface of the second sheet of glass with potassium ions from a suitable molten salt. The chemical strengthening process is controlled to provide the second sheet of glass with a depth of layer (DOL) of 35 µm and a surface compressive stress greater than 400 MPa, typically between 450 MPa and 700 MPa. The surface compressive stress may be as high as 900 MPa. The DOL may be between 30 µm and 40 µm.

A suitable glass composition for the second sheet of glass 13 is an alkali aluminosilicate glass such as Gorilla™ glass available from Corning Incorporated.

A specific composition for the second sheet 13 is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published. The iron oxide ($Fe_2O_3$) content of the second sheet may be low, being less than 0.1 percent by weight i.e. about 0.012 percent by weight.

As FIG. 2 shows, the layer of PVB 11 and the second sheet of glass 13 both extend below the line x'-x", and consequently below the line x-x' in FIG. 1, but the layer of PVB 11 and the second sheet of glass 13 are not coextensive with the first sheet of glass 9. This results in the connection region 7 not being covered by the layer of PVB 11 and the second sheet of glass 13 so that a conventional winder mechanism may be attached to the connection region 7 i.e. via holes 7c (not shown in FIGS. 2) and 7d. However, the PVB layer 11 and/or the second sheet of glass 13 may be coextensive with the first sheet of glass 9.

Figure 3:
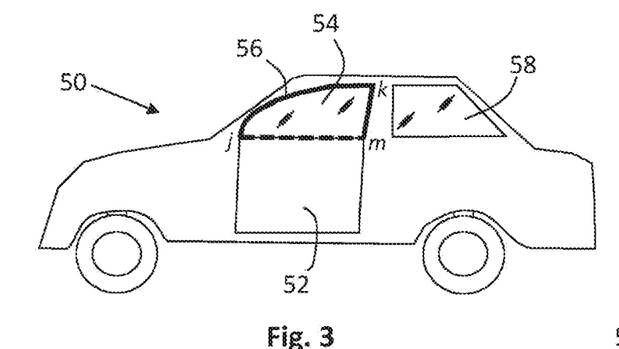
FIG. 3-6 are schematic side views of a vehicle having a vehicle side window.

FIG. 3 shows a schematic side view of a vehicle 50 (i.e. a car). The vehicle 50 has a side door 52 and an aperture 54 having a periphery 56 in which a vehicle side window of the type shown in FIGS. 1 and 2 is vertically movable therein in a manner known in the art. The periphery 56 may be part of the vehicle door i.e. a suitable frame, or a part of the vehicle body.

The periphery 56 has corners j, k and m. The line j-m defines the position of the line x-x' shown in FIG. 1. In FIG. 3 the aperture 54 is shown in a closed configuration with the vehicle side window closing the aperture 54. With reference to FIGS. 1 and 2, a portion of the major surface 10 of the first sheet of glass closes the aperture 54.

Also shown in FIG. 3, the vehicle 50 has a fixed side window 58 that may have a configuration in accordance with the present invention. However, as the side window 58 is fixed in a frame, there is no need for the side window 58 to have a connection region for connecting a winder mechanism to the side window 58.

Figure 4:
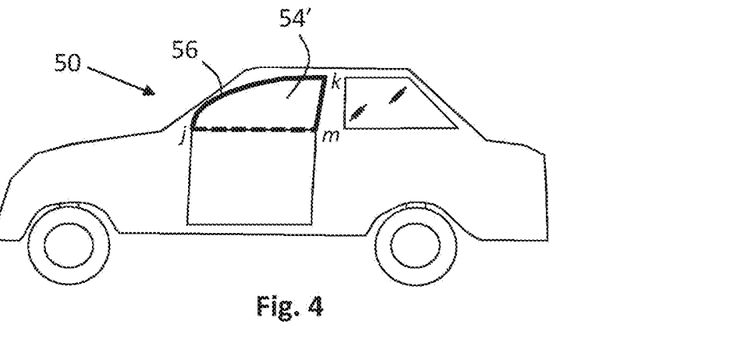

FIG. 4 shows the vehicle 50 with the aperture 54' in a second configuration with the vehicle side window wound fully down.

With reference to FIGS. 1-3, FIG. 5 shows vehicle 50 having a side door 52 incorporating a vehicle side window 1 movable in aperture 54. In this figure, the vehicle side window 1 below the line x-x' (i.e. the line j-m defined by the aperture) is shown in phantom. Located in a lower portion of the door 52 is a winder mechanism 60. A suitable linkage 62 connects the winder mechanism 60 to the connection region of the vehicle side window 1. A first linkage member 63 is in mechanical communication with the first trapezoidal portion 7a and a second linkage member 64 is in mechanical communication with the second trapezoidal portion 7b. The holes 7c, 7d may be used to attach an end of the respective linkage member 63, 64 to the respective trapezoidal portion 7a, 7b.

Figure 5:
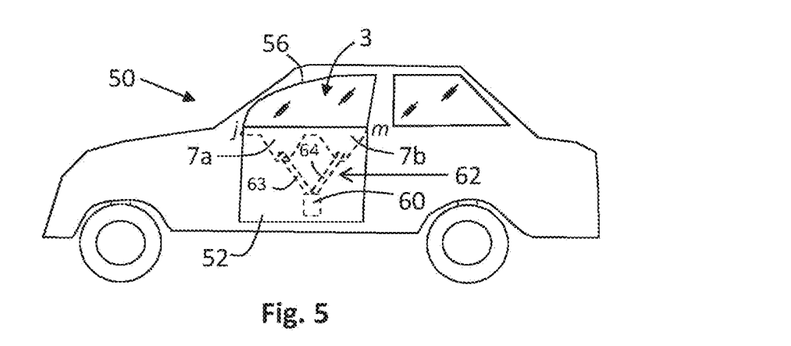

The aperture 54 is closed by the upper region 3 of the vehicle side window 1.

Figure 6:
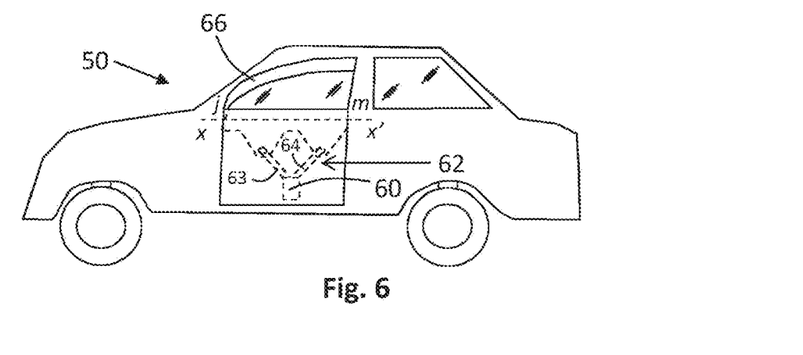

FIG. 6 shows the vehicle 50 shown in FIG. 5 where the winder mechanism 60 has been suitable actuated to wind the vehicle side window partially down such that there is an opening 66 in the aperture i.e. the aperture is no longer fully closed. By actuation of the winder mechanism 60 the winder linkage 62 moves from the first position shown in FIG. 5 to the second position shown in FIG. 6. Each of the first and second linkages 63, 64 are suitably moved towards the winder mechanism 60 thereby lowering the vehicle side window in the aperture. Consequently the line x-x' on the vehicle side window 1 moves below the line j-m defined by the aperture. The interior of the vehicle 50 is accessible via the opening 66.

In accordance with the first aspect of the present invention it has been found that the vehicle side window 1 has acceptable mechanical characteristics when the compressive stress in the central region 12 of the first sheet of glass is varied depending upon the thickness of the first sheet of glass.

Table 1 provides examples of lower and upper levels for the surface compressive stress of the first sheet of glass 9 in a central region of at least one major surface thereof that have been found to be useful for different thickness of the first sheet of glass 9.

TABLE 1

| Thickness t of first sheet of glass 9 (mm) | Target surface compressive stress (MPa) to be greater than: | Target surface compressive stress (MPa) to be less than: |
| --- | --- | --- |
| 1.4 | 18 | 23 |
| 1.6 | 23 | 26 |
| 1.8 | 26 | 30 |
| 2.1 | 30 | 35 |
| 2.3 | 35 | 45 |
| 2.6 | 45 | 65 |

For example, in accordance with table 1, in accordance with the present invention for a 1.4 mm sheet of soda-lime-silicate glass the surface compressive stress in a central region of the at least one major surface of the sheet is greater than 18 MPa and less than 23 MPa. Likewise, for a 2.1 mm sheet of soda-lime-silicate glass the surface compressive stress in a central region of the at least one major surface of the sheet is greater than 30 MPa and less than 35 MPa.

The required level of surface compressive stress in the first sheet of glass may be achieved by suitably heating the first sheet of glass to a suitably high temperature and then by suitably cooling the heated sheet of glass by directing jets of cooling fluid onto the major surfaces of the first sheet of glass.

Figure 7:
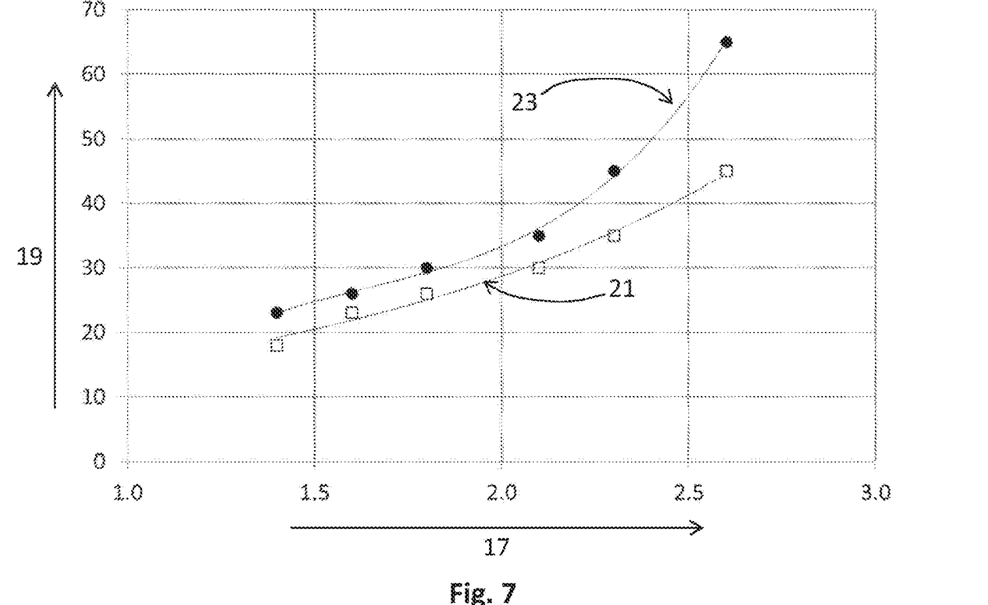
FIG. 7 is a graph showing the upper and lower value of surface compressive stress as a function of glass thickness.

FIG. 7 shows the data presented in table 1 in graphical form. The axis 17 is the thickness of the first sheet of glass in mm, and the axis 19 is the magnitude of the surface compressive stress measured using the aforementioned Strainoptics Laser GASP-CS in a central region 12 of the first sheet of glass.

The "open square" points are the target lower level of surface compressive stress CS (in MPa) in a central region of the first sheet of glass at the specified glass thickness (in mm) t.

Line 21 is a trend line through the "open square" dataset, where the trend line has the following equation:

$$CS_{target\ lower\ level}(MPa)=21.035 \times t^3 - 118.6 \times t^2 + 236.88 \times t - 138.8 \quad (1)$$

where t is the thickness of the first sheet of glass (in mm)

The "black solid circle" points are the target upper level of surface compressive stress CS (in MPa) in a central region of the first sheet of glass at the specified glass thickness (in mm) t.

Line 23 is a trend line through the "black solid circle" dataset, where the trend line has the following equation:

$$CS_{target\ upper\ level}(MPa)=28.28 \times t^3 - 139.75 \times t^2 + 244.58 \times t - 123.12 \quad (2)$$

where t is the thickness of the first sheet of glass (in mm)

For soda-lime-silicate glass, equations (1) and (2) provide the target lower and upper levels for the surface compressive stress at a given glass thickness in the range 1.4 mm to 2.6 mm, preferably when the second sheet of glass is a chemically strengthened sheet of glass having a surface compressive stress of between 400 MPa and 700 MPa and a depth of layer of 30-40 μm and a thickness of an adhesive interlayer of between 0.3 mm and 0.9 mm.

In FIG. 2 the layer of PVB 11 is only coextensive with the second sheet of glass 13. However, in an alternative embodiment to that shown, the layer of PVB 11 is coextensive with both the first and second sheets of glass. In such embodiments, the first and second sheets of glass are coextensive, or substantially coextensive, with each other.

Suitable lamination processes may be used to make the vehicle side window 1, using suitably high temperature and pressure. The layer of PVB 11 may be suitably provided in sheet form prior to the lamination process.

Figure 8:
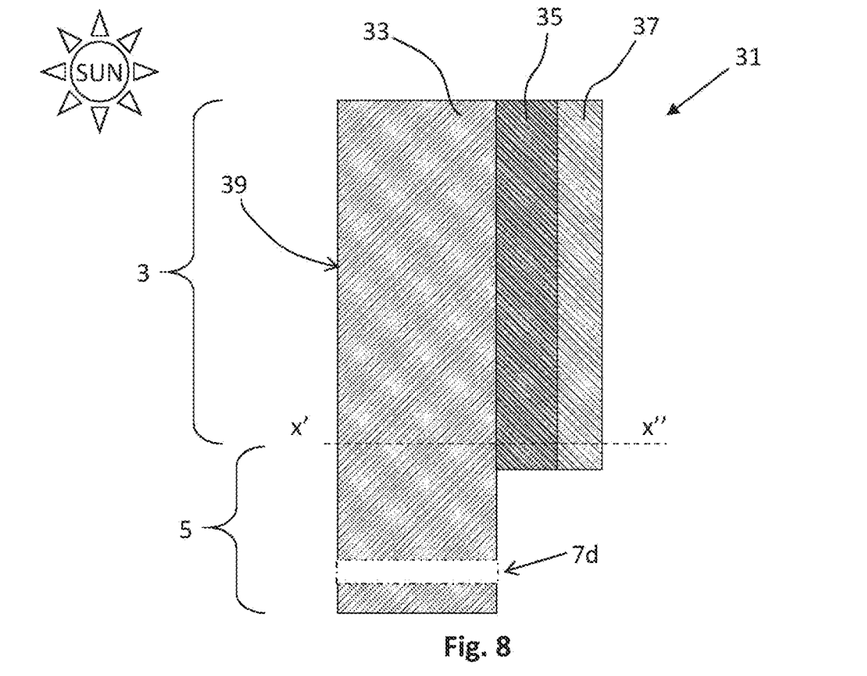
FIG. 8 is a schematic cross-sectional representation of a vehicle side window in accordance with the second aspect of the present invention.

FIG. 8 shows a schematic cross-sectional representation of a laminated glazing in accordance with the second aspect of the present invention. The laminated glazing 31 is a vehicle side window and is similar to the vehicle side window 1 described with reference to FIGS. 1 and 2. As in FIG. 2 the line x'-x" forms a horizontal plane with the line x-x'.

The laminated glazing 31 has a first sheet of glass 33 joined to a second sheet of glass 37 by means of adhesive layer 35. The adhesive layer 35 may comprise at least one layer of polyvinyl butyral (PVB), EVA, PVC, EMA, polyurethane (PU), acoustic modified PVB or Uvekol (a liquid curable resin).

The first sheet of glass has a soda-lime-silicate composition and has a thickness of 3.0 mm, but may have a thickness in between 2.8 mm and 5.5 mm. The target compressive stress in a central region 39 of the first sheet of glass is between 60 MPa and 130 MPa. In the example shown in FIG. 8, the surface compressive stress in central region 39 of the first sheet of glass was 90 MPa.

In this example the adhesive layer 35 is a layer of PVB having a thickness of 0.76 mm, although the thickness of the adhesive layer 35 may be between 0.3 mm and 0.9 mm, for example the thickness of the adhesive layer may be 0.38 mm, 0.76 mm or 0.86 mm.

The second sheet of glass 37 is a chemically strengthened sheet of glass having a thickness between 0.3 mm and 1.0 mm or between 0.3 mm and 0.8 mm. In FIG. 8, the second sheet of glass 37 has a thickness of 0.7 mm or 0.5 mm.

The second sheet of glass has been chemically strengthened using conventional molten salt ion exchange processing to provide the second sheet of glass 37 with a depth of layer (DOL) of 35 μm and a surface compressive stress greater than 400 MPa, typically between 450 MPa and 700 MPa. The surface compressive stress may be as high as 900 MPa. The DOL may be varied between 30 µm and 40 µm by adjusting the length of the chemical strengthening process and/or temperature thereof.

A suitable glass composition for the second sheet of glass is an alkali aluminosilicate glass such as Gorilla™ glass available from Corning Incorporated.

A specific composition for the second sheet 7 is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published. The iron oxide ($Fe_2O_3$) content of the second sheet may be low, being less than 0.1 percent by weight i.e. about 0.012 percent by weight.

Although in the previous figures the vehicle side windows 1, 31 are shown as being flat (or planar) having a flat outer surface, the vehicle side window 1, 31 may be curved in one or more directions. The radius of curvature in one of the one or more directions may be between 1000 mm and 8000 mm. When the laminated glazing is curved in two directions, suitably each direction of curvature is orthogonal to the other. Suitably the radius of curvature in one or both directions of curvature is between 1000 mm and 8000 mm.

Suitable techniques are known for shaping the first sheet of glass. However, the second sheet of glass may be initially flat and "cold formed" to the desired shape set by the curved first sheet of glass by applying suitable pressure to the flat second sheet of glass during the lamination process. The temperature during the lamination process is sufficient to cause to the adhesive layer (i.e. a sheet of PVB) to bond to the first and second sheets of glass, but such temperature is not sufficient to cause the second sheet of glass alone to be permanently deformed by pressing between complementary shaping members and/or sagging under the influence of gravity.

In the previous examples of the present invention, a single adhesive layer was shown joining the first sheet of glass to the second sheet of glass. However, it is within the scope of the present invention that the first sheet of glass may be joined to the second sheet of glass by an interlayer structure comprising one or more adhesive layers. For example, the interlayer structure may comprise two or more adhesive layers. Two of the two or more adhesive layers may be spaced apart by an intermediate sheet that is thermally stable at lamination temperatures. This is suitably provided by an intermediate sheet having in direct contact on one side a first adhesive layer, and in direct contact on the other side a second adhesive layer. In such a construction the first and second adhesive layers may be the same material (i.e. PVB, PVC, EVA) or they may be different i.e. the first adhesive layer may be PVB and the second adhesive layer may be EVA. The intermediate sheet may comprise polyethylene terephthalate PET, polycarbonate or be a sheet of glass, for example having the same composition as the second sheet or glass. The intermediate sheet may have an infrared ray reflecting coating on a major surface thereof.

It is known in the art that an adhesive layer used to join a first sheet of glass to a second sheet of glass may have a wedged profile, for example of the type used to provide a ghost-free head-up display windshield as described in U.S. Pat. No. 5,013,134. Such a wedged adhesive layer may be useful in the present invention.

The present invention finds particular application in the field of vehicle glazings, especially vehicle side windows that may be movable within an aperture in the vehicle or fixed in an aperture in the vehicle.

The laminated glazings may be used in the rear of a vehicle (i.e. as part or all of a vehicle backlight) or in the roof of a vehicle.

The present invention therefore provides a laminated glazing comprising first and second sheet of glass joined together by an interlayer structure comprising at least a first layer of adhesive interlayer material is disclosed. The surface compressive stress in a central region of a first major surface of the first sheet of glass is dependent upon the thickness of the first sheet of glass. For a thickness of the first sheet of glass between 1.4 mm and 2.6 mm the minimum surface compressive stress in a central region of a major surface thereof is a function of glass thickness, and for thicknesses greater than 2.6 mm and less than 8 mm a range of between 50-150 MPa for the surface compressive stress has been found useful. The second sheet of glass may be a sheet of chemically strengthened glass having a thickness between 0.3 mm and 1.0 mm. The laminated glazing may be fixed or movable in an aperture in a vehicle.

The present invention has the following aspects.

Aspect 1. A laminated glazing comprising
a first sheet of glass joined to a second sheet of glass by an interlayer structure comprising at least one (a first) layer of adhesive interlayer material,
wherein the first and second sheets of glass each have respectively a first major surface and a second opposing major surface and the laminated glazing is arranged such that at least a portion of the second major surface of the first sheet of glass faces the first major surface of the second sheet of glass;
wherein the first sheet of glass has a surface compressive stress in at least a central region of the first major surface of the first sheet of glass of at least $CS_{min}$ and wherein for a thickness t of the first sheet of glass between 1.4 mm and 2.6 mm, $CS_{min}$ in MPa is given by $$CS_{min}(MPa) = 21.0 \times t^3 - 118.6 \times t^2 + 236.9 \times t - a_1$$

wherein $a_1$ is between 135 MPa and 140 MPa, preferably wherein $a_1 = 138.5$ MPa.

Aspect 2. A laminated glazing according to aspect 1, wherein the surface compressive stress in the central region of the first major surface of the first sheet of glass is less than $CS_{max}$, wherein $CS_{max}$ in MPa is given by $$CS_{max}(MPa) = 28.3 \times t^3 - 139.8 \times t^2 + 244.6 \times t - b_1$$

wherein $b_1$ is between 120 MPa and 126 MPa preferably wherein $b_1 = 123.1$ MPa.

Aspect 3. A laminated glazing according to aspect 1 or aspect 2, wherein the thickness of the second sheet of glass is greater than 0.3 mm and/or wherein the thickness of the second sheet of glass is less than 1.0 mm.

Aspect 4. A laminated glazing according to any of the aspects 1 to 3, wherein the second sheet of glass has been chemically strengthened.

Aspect 5. A laminated glazing according to any of the aspects 1 to 4, wherein the second sheet of glass is chemically strengthened to have surface compressive stress greater than 400 MPa, preferably between 400 MPa and 900 MPa, more preferably between 400 MPa and 700 MPa, even more preferably between 450 MPa and 675 MPa.

Aspect 5. laminated glazing according to any of the aspects 1 to 5, wherein the second sheet of glass is chemically strengthened to have a depth of layer (DOL) between 10 µm and 60 µm, more preferably between 25 µm and 45 µm, even more preferably between 30 µm and 40 µm.

Aspect 7. A laminated glazing comprising
a first sheet of glass joined to a second sheet of glass by an interlayer structure comprising at least one (a first) layer of adhesive interlayer material,
wherein the first and second sheets of glass each have respectively a first major surface and a second opposing major surface and the laminated glazing is arranged such that at least a portion of the second major surface of the first sheet of glass faces the first major surface of the second sheet of glass;
the first sheet of glass having a thickness greater than 2.6 mm and less than 8 mm, preferably less than 6 mm, and wherein a surface compressive stress in a central region of the first major surface of the first sheet of glass is between 50 MPa and 150 MPa;
the second sheet of glass being a sheet of chemically strengthened glass having a thickness between 0.3 mm and 1.0 mm, a surface compressive stress greater than 400 MPa and a depth of layer between 10 µm and 60 µm.

Aspect 8. A laminated glazing according to any of the aspects 1 to 7, wherein the second sheet of glass is an alkali aluminosilicate glass composition.

Aspect 9. A laminated glazing according to any of the aspects 1 to 8, wherein the second sheet of glass includes at least about 6 wt % aluminium oxide.

Aspect 10. A laminated glazing according to any of the aspects 1 to 7, wherein the second sheet of glass has a composition comprising 66-72 mol. % $SiO_2$, 1-4 mol. % $Al_2O_3$, 8-15 mol. % MgO, 1-8 mol. % CaO, 12-16 mol.% $Na_2O$, preferably wherein MgO+CaO is between 12 and 17 mol. % and CaO/(MgO+CaO) is in the range 0.1 and 0.4 or wherein the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Aspect 11. A laminated glazing according to any of the aspects 7 to 10, wherein the second sheet of glass is chemically strengthened to have surface compressive stress between 400 MPa and 900 MPa, preferably between 400 MPa and 700 MPa, more preferably between 450 MPa and 675 MPa.

Aspect 12. A laminated glazing according to any of the aspects 7 to 11, wherein the second sheet of glass is chemically strengthened to have a depth of layer between 25 µm and 45 µm, preferably between 30 µm and 40 µm.

Aspect 13. A laminated glazing according to any of the aspects 1 to 12, wherein the first sheet of glass has a glass composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Aspect 14. A laminated glazing according to any of the aspects 1 to 13, wherein the first layer of adhesive interlayer material is coextensive with the first and/or second sheet of glass.

Aspect 15. A laminated glazing according to any of the aspects 1 to 14, wherein the first layer of adhesive interlayer material comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Aspect 16. A laminated glazing according to any of the aspects 1 to 15, wherein the first layer of adhesive interlayer material has a thickness between 0.3 mm and 2.3 mm, preferably between 0.3 mm and 1.6 mm, more preferably between 0.3 mm and 0.9 mm.

Aspect 17. A laminated glazing according to any of the aspects 1 to 16, wherein the laminated glazing has a solar control function.

Aspect 18. A laminated glazing according to aspect 17, wherein the solar control function is provided at least in part by a functional coating on the first and/or second sheet of glass.

Aspect 19. A laminated glazing according to aspect 17 or aspect 18, wherein the solar control function is provided at least in part by the first and/or second sheet of glass.

Aspect 20. A laminated glazing according to any of the aspects 17 to 19, wherein the solar control function is provided at least in part by the interlayer structure.

Aspect 21. A laminated glazing according to any of the aspects 1 to 20, wherein the laminated glazing comprises a low emissivity coating on at least a portion of the first and/or second major surface of the first and/or second sheet of glass.

Aspect 22. A laminated glazing according to any of the aspects 1 to 21, wherein the first and second sheets of glass each have a respective periphery and the periphery of the second sheet of glass is contiguous with the periphery of the first sheet of glass or the periphery of the second sheet of glass is enclosed within the periphery of the first sheet of glass, preferably wherein a portion of the periphery of the first sheet of glass is aligned with a portion of the periphery of the second sheet of glass.

Aspect 23. A laminated glazing according to any of the aspects 1 to 22, wherein the first and/or second sheet of glass comprises a respective first connection portion for connecting the laminated glazing to a mechanism for moving the laminated glazing, preferably in a vertical direction.

Aspect 24. A laminated glazing according to aspect 23, wherein the first sheet of glass comprises a hole therein to define a first connection portion, further wherein the first layer of adhesive interlayer material has a hole therein and the hole in the first layer of interlayer material is concentric with the hole in the first sheet of glass.

Aspect 25 A laminated glazing according to aspect 24, wherein the hole in the first sheet of glass and the hole in the first layer of adhesive interlayer material are the same shape, preferably circular in shape.

Aspect 26. A laminated glazing according to aspect 24 or aspect 25, wherein the support sheet has a hole therein and the hole in the support sheet is concentric with the hole in the first layer of adhesive interlayer material.

Aspect 27. A laminated glazing according to aspect 26, wherein the hole in the support sheet and the hole in the first layer of adhesive interlayer material are the same shape, preferably circular in shape.

Aspect 28. A vehicle having an aperture for a window, in particular a side window, wherein a lasminated glazing according to any of the aspects 1 to 22 is fixed within the aperture.

Aspect 29. A vehicle having an aperture for a window, in particular a side window, wherein a laminated glazing according to any of the aspects 1 to 27 is movable within the aperture.

Aspect 30. A vehicle having an aperture for a window, in particular a side window, wherein a laminated glazing according to any of the aspects 23 to 27 is movable within the aperture by means of a mechanism connected to the first connection portion of the first or second sheet of glass.

Aspect 31. A vehicle according to aspect 30, wherein the laminated glazing is vertically movable in the aperture.

Aspect 32. A vehicle according to any of the aspects 29 to 31, the vehicle having an interior and the aperture having a periphery, wherein the laminated glazing is movable to a first position to close the aperture such that from outside the vehicle, the interior of the vehicle is not accessible via the aperture, and when the laminated glazing is in the first position there is a portion of the laminated glazing not facing the aperture and a portion of the second major surface of the first sheet of glass is not directly facing the first major surface of the second sheet of glass.

The invention claimed is:

1. A laminated vehicle glazing for a window in a vehicle, the laminated glazing being curved and comprising
a first sheet of glass joined to a second sheet of glass by an interlayer structure comprising at least a first layer of adhesive interlayer material,
wherein the first and second sheets of glass each have respectively a first major surface and a second opposing major surface and the laminated glazing is arranged such that at least a portion of the second major surface of the first sheet of glass faces the first major surface of the second sheet of glass;
wherein the first sheet of glass has a thickness t of between 1.4 mm and 2.6 mm, and a surface compressive stress in at least a central region of the first major surface of the first sheet of glass of at least $CS_{min}$ and less than $CS_{max}$;
wherein $CS_{min}$ in MPa is given by $$CS_{min}(MPa)=21.0 \times t^3 \times 118.6 \times t^2 + 236.9 \times t - a_1$$

wherein $a_1$ is between 135 MPa and 140 MPa
and wherein $CS_{max}$ in MPa is given by $$CS_{max}(MPa)=28.3 \times t^3 - 139.8 \times t^2 + 244.6 \times t - b_1$$

wherein $b_1$ is between 120 MPa and 126 MPa;
further wherein
the thickness of the second sheet of glass is between 0.3 mm and 1.0 mm;
the second sheet of glass has been chemically strengthened;
the first sheet of glass is a sheet of soda-lime-silicate glass and has a glass composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%; and
wherein: i) the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$ and wherein MgO+CaO is between 12 and 17 mol. % and CaO/(MgO+CaO) is in the range 0.1 and 0.4; or ii) the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13% by weight, that the sum of the amounts of $Al_2O_3$ plus MgO divided by the amount of $K_2O$ exceeds 3 and that the sum of the $Na_2O$ plus $K_2O$ plus MgO exceeds 22% by weight.

2. A laminated vehicle glazing according to claim 1, wherein the second sheet of glass has been chemically strengthened to have surface compressive stress between 400 MPa and 700 MPa.

3. A laminated vehicle glazing according to claim 1, wherein the second sheet of glass has been chemically strengthened to have surface compressive stress between 450 MPa and 675 MPa.

4. A laminated vehicle glazing according to claim 1, wherein the second sheet of glass is chemically strengthened to have a depth of layer (DOL) between 10 μm and 60 μm.

5. A laminated vehicle glazing according to claim 1, wherein the second sheet of glass is chemically strengthened to have a depth of layer (DOL) between 25 μm and 45 μm.

6. A laminated vehicle glazing for a window in a vehicle, the laminated glazing being curved and comprising
a first sheet of glass joined to a second sheet of glass by an interlayer structure comprising at least a first layer of adhesive interlayer material,
wherein the first and second sheets of glass each have respectively a first major surface and a second opposing major surface and the laminated glazing is arranged such that at least a portion of the second major surface of the first sheet of glass faces the first major surface of the second sheet of glass;
the first sheet of glass having a thickness greater than 2.6 mm and less than 8 mm, and wherein a surface compressive stress in a central region of the first major surface of the first sheet of glass is between 50 MPa and 150 MPa;
the second sheet of glass being a sheet of chemically strengthened glass having a thickness between 0.3 mm and 1.0 mm; wherein
the first sheet of glass is a sheet of soda-lime-silicate glass and has a glass composition comprising (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2% and $Fe_2O_3$ 0.005-2% and
wherein: i) the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$ and wherein MgO+CaO is between 12 and 17 mol. % and CaO/(MgO+CaO) is in the range 0.1 and 0.4; or ii) the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13% by weight, that the sum of the amounts of $Al_2O_3$ plus MgO divided by the amount of $K_2O$ exceeds 3 and that the sum of the $Na_2O$ plus $K_2O$ plus MgO exceeds 22% by weight.

7. A laminated vehicle glazing according to claim 6, wherein the second sheet of glass is chemically strengthened to have surface compressive stress between 400 MPa and 700 MPa and/or wherein the second sheet of glass is chemically strengthened to have a depth of layer (DOL) between 10 μm and 60 μm.

8. A laminated vehicle glazing according to claim 6, wherein the first layer of adhesive interlayer material is coextensive with the first and/or second sheet of glass.

9. A laminated vehicle glazing according to claim 6, wherein the first layer of adhesive interlayer material comprises polyvinyl butyral (PVB), acoustic modified PVB, a copolymer of ethylene, ethylene vinyl acetate (EVA), polyurethane (PU), polycarbonate, poly vinyl chloride (PVC) or a copolymer of ethylene and methacrylic acid; and/or wherein the first layer of adhesive interlayer material has a thickness between 0.3 mm and 2.3 mm.

10. A laminated vehicle glazing according to claim 6 having a solar control function.

11. A laminated vehicle glazing according to claim 10, wherein the solar control function is provided by a solar control coating on the first and/or second sheet of glass, and/or wherein the solar control function is provided by the first and/or second sheet of glass.

12. A laminated vehicle glazing according to claim 10, wherein the solar control function is provided by the first layer of adhesive interlayer material.

13. A laminated vehicle glazing according to claim 10, wherein the interlayer structure comprises a second layer of adhesive interlayer material and an intermediate sheet, the intermediate sheet being between the first and second layers of adhesive interlayer material, and wherein the solar control function is provided by the intermediate sheet.

14. A laminated vehicle glazing according to claim 13, wherein the intermediate sheet is a carrier sheet that carries an infrared reflecting coating and/or wherein the first and/or second layer of adhesive interlayer material comprises functional inclusions that reduce the amount of solar radiation that may otherwise be transmitted through the laminated glazing.

15. A laminated glazing according to claim 6, wherein the periphery of the second sheet of glass is enclosed within the periphery of the first sheet of glass.

16. A laminated vehicle glazing according to claim 15, wherein a portion of the periphery of the first sheet of glass may be aligned with a portion of the periphery of the second sheet of glass.

17. A laminated vehicle glazing according to claim 1 being a side window for a vehicle.

18. A laminated vehicle glazing for a window in a vehicle, the laminated glazing being curved and comprising
 a first sheet of soda-lime-silicate glass joined to a second sheet of glass by an interlayer structure comprising at least a first layer of adhesive interlayer material,
 wherein the first sheet of soda-lime-silicate glass has a glass composition comprising (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2% and $Fe_2O_3$ 0.005-2%;
 wherein the first and second sheets of glass each have respectively a first major surface and a second opposing major surface and the laminated glazing is arranged such that at least a portion of the second major surface of the first sheet of glass faces the first major surface of the second sheet of glass;
 wherein the second sheet of glass is a sheet of chemically strengthened glass having a thickness between 0.3 mm and 1.0 mm;
 and wherein the first layer of adhesive interlayer material is coextensive with the second sheet of glass and not coextensive with the first sheet of glass;
 further wherein (i) the first sheet of soda-lime-silicate glass has a thickness t of between 1.4 mm and 2.6 mm, and a surface compressive stress in at least a central region of the first major surface of the first sheet of glass of at least $CS_{min}$ and less than;
 wherein $CS_{min}$ in MPa is given by $CS_{min}(MPa)=21.0 \times t^3 \times 118.6 \times t^2 + 236.9 \times t - a_1$ wherein $a_1$ is between 135 MPa and 140 MPa
 and wherein $CS_{max}$ in MPa is given by $CS_{max}(MPa)=28.3 \times t^3 - 139.8 \times t^2 + 244.6 \times t - b_1$ wherein $b_1$ is between 120 MPa and 126 MPa; or (ii) the first sheet of soda-lime-silicate glass has a thickness greater than 2.6 mm and less than 8 mm, and wherein a surface compressive stress in a central region of the first major surface of the first sheet of glass is between 50 MPa and 150 MPa.

19. A laminated glazing according to claim 18, wherein the first and second sheets of glass each have a periphery and the the periphery of the second sheet of glass is enclosed within the periphery of the first sheet of glass.

20. A laminated side window for a vehicle comprising a laminated vehicle glazing according to claim 18.

* * * * *